A. D. RENFRO.
SPEED INDICATOR AND RECORDER.
APPLICATION FILED JULY 3, 1909.

976,694.

Patented Nov. 22, 1910.

5 SHEETS—SHEET 1.

A. D. RENFRO.
SPEED INDICATOR AND RECORDER.
APPLICATION FILED JULY 3, 1909.

976,694.

Patented Nov. 22, 1910.
5 SHEETS—SHEET 2.

WITNESSES.
Clarence E. Day
L. C. Jennings

INVENTOR.
Alva D. Renfro
by Parker & Burton
Attorneys.

A. D. RENFRO.
SPEED INDICATOR AND RECORDER.
APPLICATION FILED JULY 3, 1909.

976,694.

Patented Nov. 22, 1910.
5 SHEETS—SHEET 3.

WITNESSES

INVENTOR.
Alva D. Renfro
by Parker & Burton
Attorneys.

A. D. RENFRO.
SPEED INDICATOR AND RECORDER.
APPLICATION FILED JULY 3, 1909.

976,694.

Patented Nov. 22, 1910.
5 SHEETS—SHEET 4.

WITNESSES.   INVENTOR.
Clarence E. Day   Alva D. Renfro
W. C. Jennings   by Parker & Burton
  Attorneys.

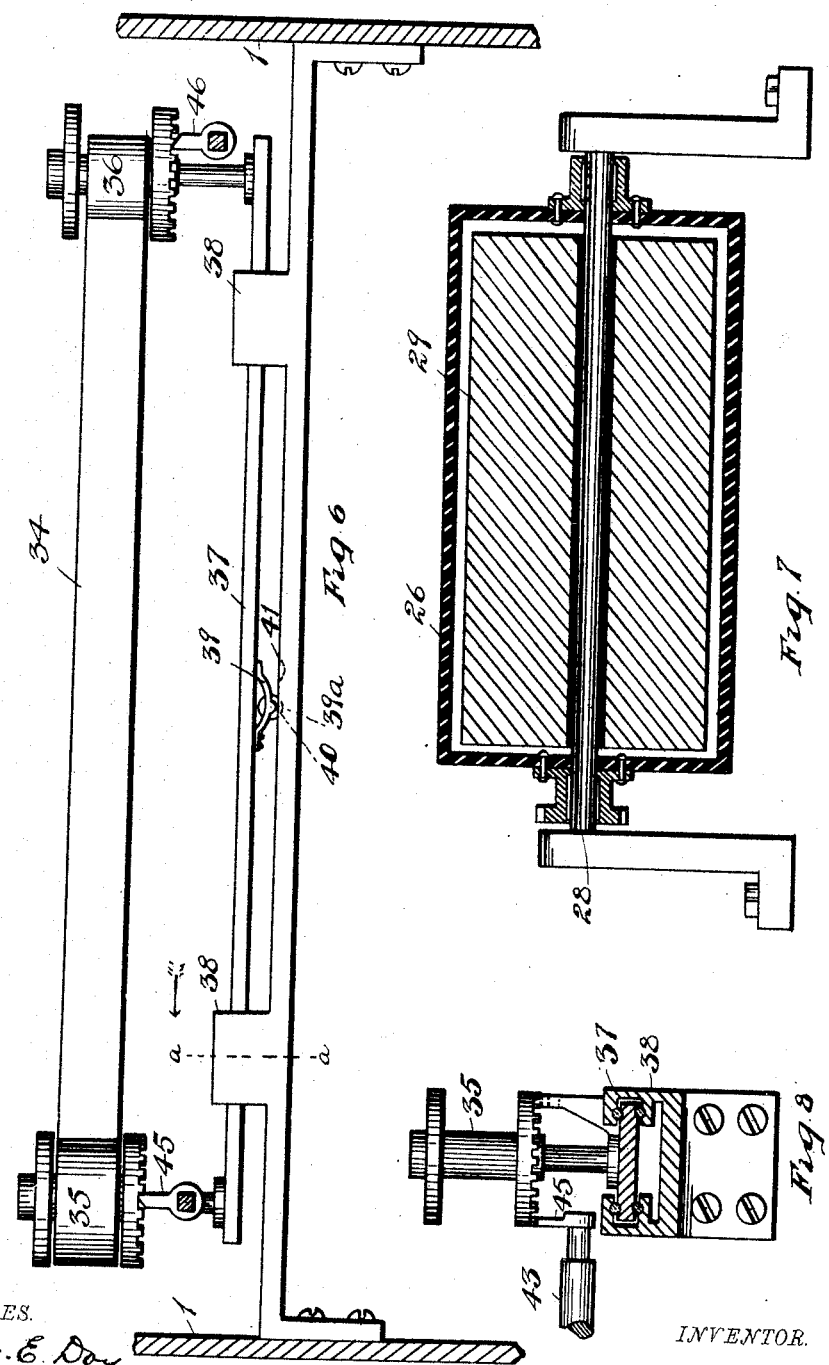

UNITED STATES PATENT OFFICE.

ALVA D. RENFRO, OF DETROIT, MICHIGAN, ASSIGNOR TO RENFRO SPEED-O-METER COMPANY, OF DETROIT, MICHIGAN, A CORPORATION OF MICHIGAN.

SPEED INDICATOR AND RECORDER.

976,694. Specification of Letters Patent. Patented Nov. 22, 1910.

Application filed July 3, 1909. Serial No. 505,797.

*To all whom it may concern:*

Be it known that I, ALVA D. RENFRO, of Detroit, Wayne county, Michigan, who am a citizen of the United States, residing at Detroit, county of Wayne, State of Michigan, have invented a certain new and useful Improvement in Speed Indicators and Recorders, and declare the following to be a full, clear, and exact description of the same, such as will enable others skilled in the art to which it pertains to make and use the same, reference being had to the accompanying drawings, which form a part of this specification.

This invention relates to an attachment to an automobile or other vehicle for the purpose of indicating and recording its speed of travel, or, if not in motion, the fact and duration thereof at any and all hours.

It consists essentially of a casing wherein is inclosed a speed indicator provided with a hand or arrow for observation by the user, a series of fingers or keys, one or more of which is actuated, depending upon the speed of rotation of the governor or speed indicator, and the corresponding position of the registering mechanism, rolls for storing and winding a chart or ribbon of paper, whereon the recording is kept, and a clock for indicating the time, and by its movement imparting corresponding actuation to the roll-winding mechanism.

Figure 1:
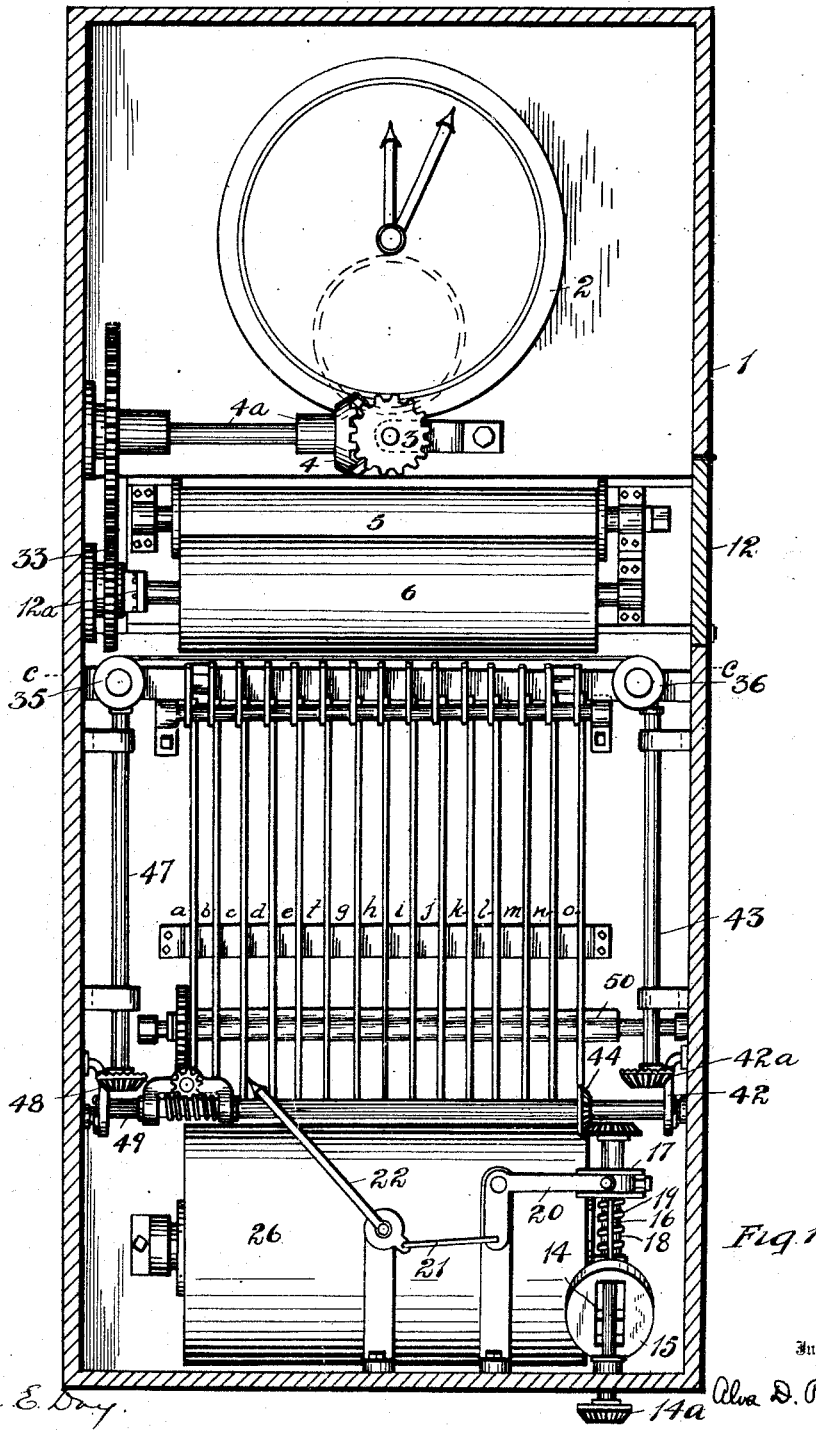
Figure 2:
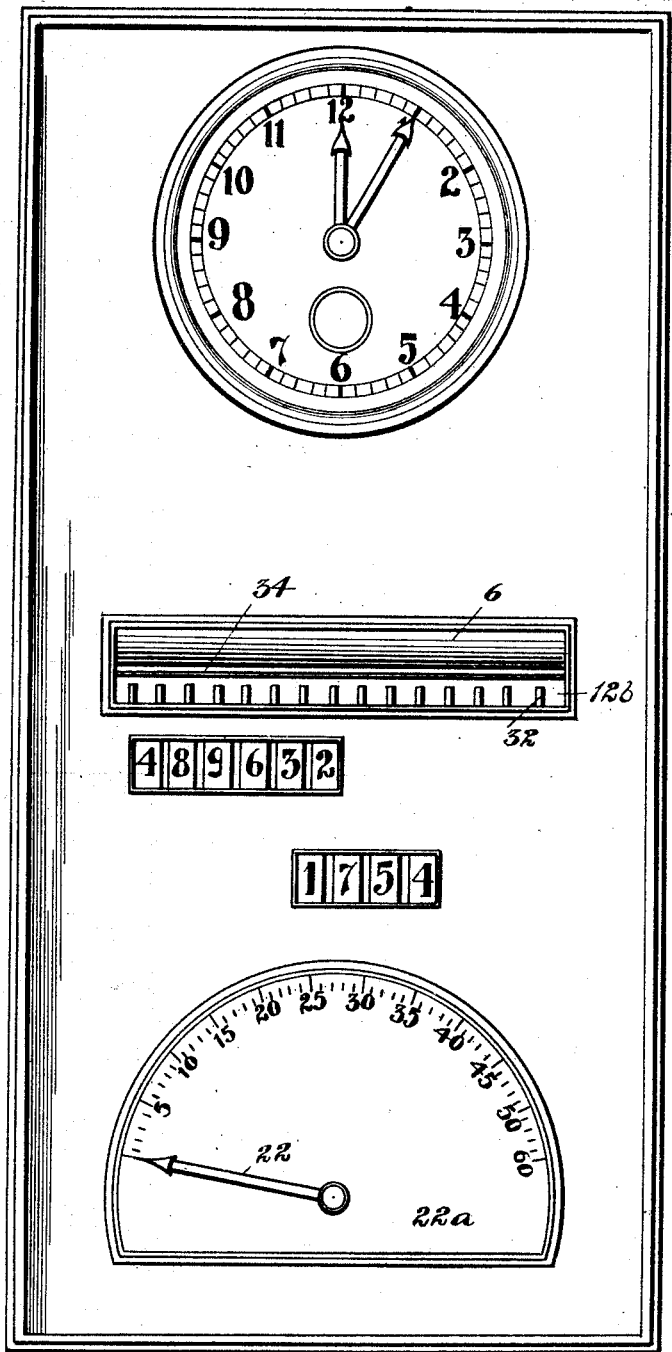
Figure 3:
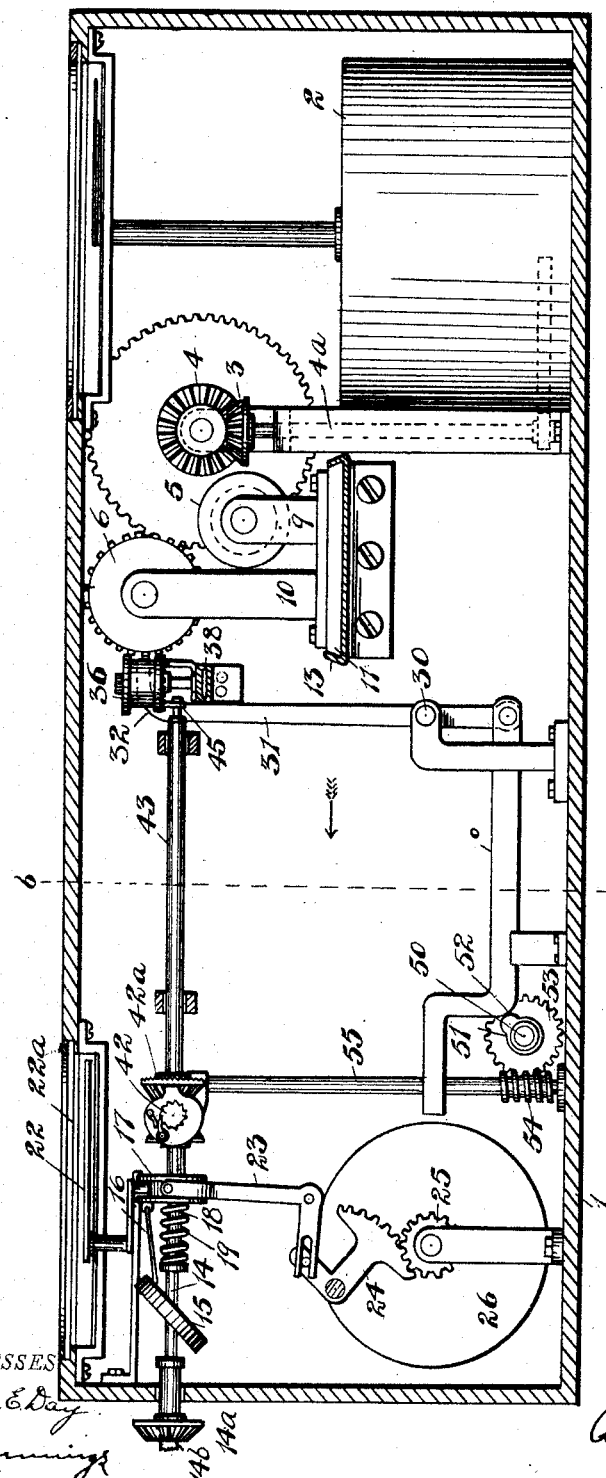
Figure 4:
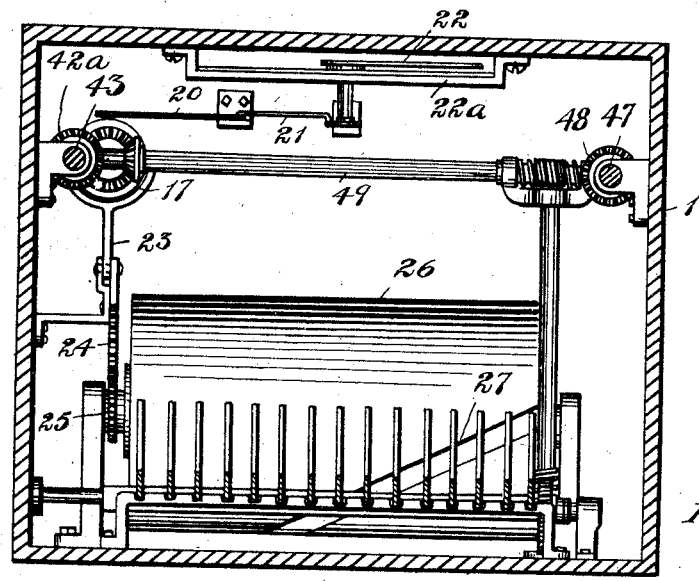
Figures 5, 9:
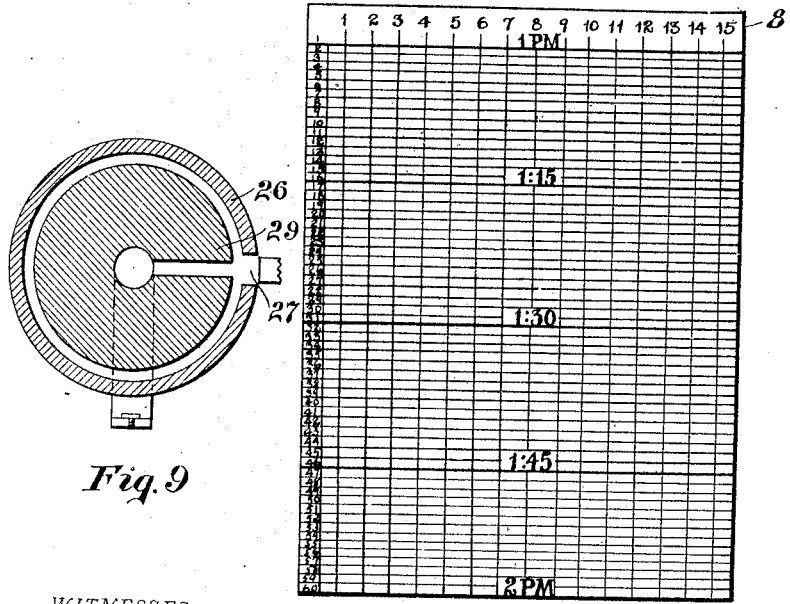

In the drawings: Figure 1, is a plan view of the device with the cover removed. Fig. 2, is a similar view of the device with most of the cover parts in place, some being more or less broken away to indicate the relative position of the operative parts to the assembled device. Fig. 3, is a side elevation of the device with the side of the casing removed. Fig. 4, is an elevation of the device looking forward in the direction of the arrow from the line $b$—$b$ of Fig. 3. Fig. 5, shows a section of the chart or recording ribbon. Fig. 6, is an elevation of the ribbon-carrying mechanism, substantially along the line $c$—$c$, Fig. 1. Fig. 7, is a sectional elevation of the key-actuating roll and the magnet contained therewithin. Fig. 8, is a detail view, showing the roller bearings and the associated parts whereon the ribbon drums are movably carried. Fig. 9 is a cross-section of the actuating magnet and its containing case along the line $a$—$a$ Fig. 7.

Similar characters refer to similar parts.

1, represents the casing, in the upper portion of which is mounted a clock 2, which by intermeshing gear wheels 3 and 4, and the shafts $4^a$ and $4^b$, imparts actuation to the rollers 5 and 6, which are respectively the storage and the accumulation drums, whereon the strip of recording paper 8, is wound. These rollers are rotatably mounted on standards 9, 10, which rise from a base 11, which is removably slid through a door 12 within the hold of a track-way 13, fixed to the rear inner face of the casing, so that when one of the ribbons is fully used and its registry tape has run its course the drum whereon it is rolled may be slipped from its meshing engagement with the clutch $12^a$, and another standard with fresh rolls substituted. As shown in Fig. 2, this portion of the casing has a glass cover $12^b$, so that a considerable proportion of the exposed part of the sheet or ribbon with its registries thus far, as hereinafter described, can be observed by the driver of the machine.

At the lower end of the casing is located a centrifugal speed indicator 14, which is adapted to be attached at its end $14^a$, to the end of a flexible shaft $14^b$, which is in geared connection with one of the running wheels of a vehicle. I have illustrated this governor as of a well-known type, but do not desire to be considered as restricted thereto, the device as a whole being adapted, with changes of negligible degree, to make use of any type of governor.

As the speed of the vehicle increases, the tendency of the weight 15, is to assume a position more nearly at right angles to the axis of the shaft of the indicator 14, upon which it is mounted. It draws with it, through the medium of the link 16, the spool 17, which is mounted on a fixed sleeve 18, but whose travel toward the point of pivot of the weight 15, on the shaft is resiliently opposed, by the spring 19. Through the medium of the pivoted lever 20, and link 21, the pivoted indicator arrow 22, is thus moved in an arc across a graduated dial $22^a$, (see Fig. 2), whereon the graduations into distances are indicated as desired. Contemporaneously with the actuation of this indicator, the movement of this spool 17, is communicated, through the medium of the link 23, and toothed lever 24, to the rotatably supported end 25, of the key-actuating drum 26, in whose side walls there is an oblique slot 27, so located with respect to the periphery of the drum itself that, when the vehicle is not in motion, no part of this oblique slot 27, is opposite and in registry with any one of the keys, $a$, $b$, $c$, $d$, &c., whose forward ends normally impinge against its surface. Within this drum, and fixedly held from rotation upon the shaft 28, is a magnet 29 (see particularly Fig. 7) which, but for the interposition of the shell of the drum 26, would draw into contact with it the ends of the several keys above named. When, however, by the rotation of the drum 26, as above described, any part of the oblique slot is brought opposite the end of any one of the keys, the pull of the magnet 29, will draw it to itself. The magnet is, as regards its cross-section, preferably of the "horseshoe" type, that is, it may be compared to a section of pipe from whose wall a narrow lengthwise ribbon or strip has been cut away. The space separating the poles thus constituted is, however, so narrow that the impinging ends of the keys are enough larger so that they are not caught therebetween when drawn theretoward through the oblique slot 27. For compactness of illustration I have here illustrated a device wherein there are but fifteen such registering keys, which, under my scheme of registering, would indicate speed only up to that number of miles, but it is obvious that this number may be increased as desired, its result simply being a broadening of the casing, but in no way calling into action any additional parts other than exact duplicates of those shown. Similarly I desire it to be understood that I do not confine myself to the use of a slotted drum. A drum wherein the desired points in its wall are individual holes could easily be substituted. And, were it not for the increased thickness of the device as a whole that would be caused thereby, a slotted or perforated sheet or plate that would be actuated transversely of the machine, across the ends of the keys, might be substituted for the drum without departing from the idea here sought to be developed.

In Fig. 3, the extreme right-hand key $o$, is shown in elevation. Assuming the vehicle to be going at the rate of fifteen miles an hour the rotation of the governor would be such as to move the drum 26, around to such a degree that this key $o$, would be opposite to the slot and drawn thereinto by the pull of the magnet 29; being pivoted at 30, the effect of this forward draw upon the key $o$, is to project the upper end 32, of the lever 31, against the printing roller 6, over which the ribbon is being drawn. This would sometimes have no other than a perforating effect were it not for the presence across the printing end of all of the levers attached to their respective keys. $a$, $b$, $c$, $d$, &c., of a printing ribbon 34, which being carried on drums 35, 36, travels there-across in something the manner encountered in an ordinary typewriter. While less desirable both structurally and operatively, a spring for actuating each individual key might be substituted for the magnet. The method which I have found preferable in the mounting and carriage of this ribbon consists in the frame 37, whereon the supporting posts for the drums 35, 36, are carried, and which passes through bearings 38, and is also made to rest, through the medium of a bracket 39, carrying a roller $39^a$, in one of two recessed portions, 40, 41, in the underwall of its support. This ribbon is regularly actuated through the medium of the ratchet 42, the gear wheel $42^a$, and shaft 43, operating on the eccentric or ratchet 45, which in turn engages the toothed end of the drum 35, to rotatably actuate the same. When the ribbon has all been unwound from one drum and completely wound (except for its extent across the printing ends of the key levers) upon the other drum, the next actuating impulse caused by the rotation of the shaft 43, causes a bodily movement of the supporting roller $39^a$, and with it the entire frame 37, and the drum which it supports, from the recessed hollow 40, to the hollow 41. This operates to throw the frame, and with it the drums, transversely with respect to the entire casing 1, so that, whereas, for example, the drum 35, was receiving its actuations from the eccentric 45, that member is by this side-wise movement of the frame 37, thrown out of gear and in its place the eccentric 46, is thrown into mesh with the gear on the drum 36, this eccentric 46, in turn receiving its actuation through the medium of the shaft 47, and gear wheel 48, from the toothed wheel 49, on the opposite end of the shaft from the wheel 44.

The various keys, $a$, $b$, $c$, $d$, &c., being entirely without spring actuation would remain in the drawn-forward position due to their attraction by the magnet 29, and (with their imprinting link members 31) in corresponding projected position against the printing roller were it not for the presence on the shaft 50, of an eccentric 51, which extends therealong entirely across the bank of keys or fingers, engaging against the shoulder 52, of the key-bar, and forces it away from its position wherein its forward end is in contact with the magnet. This shaft 50, whereon it is mounted derives its actuation from the gear wheel 53, fixed thereto and the worm 54, mounted on the shaft 55, which also derives its actuation from the rotation of the governor shaft 14, so that by proper proportioning of the size of the various parts their desired timing can be secured, and so that when the governor is under no actuating influence the other parts are at rest.

Of course in the arrangement illustrated the periods of inactivity of the vehicle would be indicated by the entire absence of recording imprints upon the sheet 8, which would nevertheless be continuously moved by the clock mechanism, so that unless the intermediate gearing had been tampered with an owner who, for instance, desired assurance that his automobile, which had been run to a garage, at a specified hour, had not been taken out again by some unauthorized person, would have but to inspect the roller covering the time between its deposit in the garage and his next use of the machine to find if the sheet was wholly clear, that his wishes to its non-use had been respected, or if they had not been, just what time and for how long and at just what speed the machine had been run would be indicated by a line of dots, the position of each of which would, by comparison with the horizontal and vertical columns, show just what had been done at each time. If the machine had been run very slowly the line of dots would lie entirely closely along the left-hand edge of the recording ribbon; if frequent variations of speed have characterized a run the quite radical sweep of the line of dots from one side of the sheet to the other will indicate it, since by this speed the degree of actuation of the governor will be regulated, and by it, in the manner indicated the actuation of the key drum 26, and the various keys is regulated.

What I claim is:

1. In a speed recorder, in combination with a governor adapted to receive its actuation from a rotatable shaft, a drum having an apertured side wall, a magnet therein, interconnecting means between the governor and the drum whereby said drum is caused to rotate upon the actuation thereof, registering keys adapted to be actuated by said magnet when the drum is rotated and its apertured portion is thus brought opposite thereto, a recording roll, a printing ribbon interposed therebetween and the printing ends of the keys, and clock mechanism in operative connection therewith, whereby the movement of said printing roll and its recording sheet is regulated, substantially as described.

2. In a speed recorder, the combination of a governor member, a bank of printing keys, a magnet for actuating the same, an apertured rotatable drum in operative connection with said governor, whereby the keys are normally kept from responding to unintended actuation by said magnet, a printing roll, a printing ribbon interposed between said roll and the printing ends of the keys, and means for causing the travel of a record sheet past said roll and said ribbon at the desired speed, substantially as described.

3. A speed recorder, having in combination with means for causing the timed travel of a record sheet, a bank of individually actuatable keys for recording variations of speed thereon, a magnet adapted to actuate said keys, a movable member interposed between said magnet and the ends of the keys, whereby the unintended actuation of the keys thereby is prevented, and a governor member in operative connection therewith, by whose movement said movable member is actuated, substantially as described.

4. In combination with a rotatable shaft, a governor member adapted to be actuated thereby, a magnet member, a bank of keys normally held from actuation thereby, the actuation of the individual keys being dependent on the degree of movement of the governor member, means whereby each key is positively restored to its normal position after its actuation, and means for causing and regulating the travel of a recording sheet, substantially as described.

5. In combination with motive means for a record sheet, a bank of individual keys adapted to cause imprinting on the sheet by the impact of their printing ends, a governor member, and means mounted independently of said governor member, though having an operative connection therewith, whereby the selective actuation of the individual keys against the record sheet is regulated by the speed of movement of said governor member, substantially as described.

6. In a speed recorder, in combination with a bank of individual keys, means for producing the timed movement of a record sheet with respect to the striking ends of said keys, means for actuating the keys, means for rendering any key temporarily unresponsive to the actuating means, and a governor member adapted to control the key-detaining means, substantially as described.

7. In a speed recorder, the combination of a governor member, a rotatable shaft from which the governor derives its actuation, an indicating arm adapted to be controlled in its movement by the speed of movement of said governor member, a bank of individual keys, means for causing the travel of a record sheet past the striking ends of said keys, actuating means for said keys, and means deriving its actuation from the same source as said indicating arm for holding any or all of said keys from responding to the pull of said actuating means, substantially as described.

8. In combination with means for producing a movement of a record sheet, a bank of striking keys, a ribbon interposed between the engaging ends thereof and the record sheet, a frame supporting the same, means for causing a reverse movement of the ribbon when it has reached the limit of its movement between its supports in either direction, means for actuating the keys, means for temporarily and selectively keeping the same from acting on said keys, and a centrifugal governor member adapted to actuate said last mentioned means and said ribbon-reversing means, substantially as described.

9. A speed indicator and recorder, having in combination with a rotary shaft, a governor member in connection therewith, an indicating arm deriving its actuation therefrom, a magnet, printing keys adapted to be actuated thereby, selective means for normally holding the keys from actuation by said magnet, means for forcing each key from further contact with the magnet after its cycle of movement due to its actuation has been accomplished, and means for causing the timed travel of a record sheet with respect to said keys, substantially as described.

10. In a speed recorder, the combination of a governor member, a plurality of connected shaft members actuated by the movement thereof, means for producing the timed travel of a recording sheet, printing keys adapted to strike thereagainst, a magnet for actuating said keys, an obliquely apertured rotatable drum extending about said magnet, whereby the adjacent ends of the keys are normally kept from actuation thereby, means connecting said governor and its connected shafts with said drum whereby the movement of the governor rotatably actuates the drum to permit the engagement of the key ends through said aperture under the actuation of the magnet, and means actuated by one of said connected shafts for forcing each key back to its initial position after it has delivered its stroke, substantially as described.

In testimony whereof, I sign this specification in the presence of two witnesses.

ALVA D. RENFRO.

Witnesses:
CLARENCE E. DAY,
WILLIAM M. SWAN.